US008577595B2

(12) United States Patent
Zhao et al.

(10) Patent No.: US 8,577,595 B2
(45) Date of Patent: Nov. 5, 2013

(54) LOCATION AND PATH-MAP GENERATION DATA ACQUISITION AND ANALYSIS SYSTEMS

(75) Inventors: Yang Zhao, Andover, MA (US); Jin Liang, Southborough, MA (US)

(73) Assignee: Memsic, Inc., Andover, MA (US)

( * ) Notice: Subject to any disclaimer, the term of this patent is extended or adjusted under 35 U.S.C. 154(b) by 909 days.

(21) Appl. No.: 12/218,765

(22) Filed: Jul. 17, 2008

(65) Prior Publication Data
US 2010/0017124 A1    Jan. 21, 2010

(51) Int. Cl.
*G01M 17/00* (2006.01)
*G01C 21/26* (2006.01)

(52) U.S. Cl.
CPC ........................ *G01C 21/26* (2013.01)
USPC .......... 701/408; 701/32.3; 701/410; 382/103; 382/106

(58) Field of Classification Search
CPC ............................ G06K 9/00791; G01C 21/26
USPC ........... 701/212, 220; 340/435; 382/106, 107, 382/103, 154; 396/153
See application file for complete search history.

(56) References Cited

U.S. PATENT DOCUMENTS

| | | | |
|---|---|---|---|
| 6,483,429 B1 | 11/2002 | Yasui et al. | |
| 6,522,266 B1 | 2/2003 | Soehren et al. | |
| 6,690,294 B1 * | 2/2004 | Zierden | 340/937 |
| 6,836,971 B1 | 1/2005 | Wan | |
| 7,463,184 B2 * | 12/2008 | Segawa | 701/301 |
| 2004/0167670 A1 * | 8/2004 | Goncalves et al. | 700/259 |
| 2007/0219667 A1 * | 9/2007 | Jung et al. | 700/245 |
| 2008/0030376 A1 | 2/2008 | Tunnell et al. | |
| 2008/0077326 A1 * | 3/2008 | Funk et al. | 701/220 |
| 2009/0041302 A1 * | 2/2009 | Nagaoka et al. | 382/103 |

* cited by examiner

*Primary Examiner* — Ryan Zeender
*Assistant Examiner* — Hunter Wilder
(74) *Attorney, Agent, or Firm* — Preti Flaherty Beliveau & Pachios LLP (57) ABSTRACT

A device, system, and method for generating location and path-map data for displaying a location and path-map is disclosed. The device includes a first set of sensors for generating a plurality of first data signals with respect to an attitude of an object; a second set of sensors for generating a plurality of second data signals with respect to the attitude of the object; an imaging device for generating a plurality of third data signals that include a most significant feature, which is disposed in at least two images of the imaging device; and at least one processing device that is adapted to calculate a heading direction (bearing) of the device using the plurality of first data signals and the plurality of second data signals; to calculate a distance traveled along the heading direction using the plurality of third data signals; and to translate the calculated heading direction and calculated distance traveled into a leg or portion of a leg of a path-map for visual display on a two- or three-dimensional system.

17 Claims, 4 Drawing Sheets

LOCATION AND PATH-MAP GENERATION DATA ACQUISITION AND ANALYSIS SYSTEMS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates generally to location and track or path-mapping systems, and more specifically to location and path-map-generation data acquisition and analysis systems that provide accurate, instantaneous position information and traversed-path data without relying on line-of-sight, extra-terrestrial satellites.

Traditional vehicular positional mapping and path-mapping systems include a first set of sensing devices ("sensors") and a second set of inertial sensors or vehicle tracking sensors. The first set of sensors is adapted to record vehicle performance data while the second set of inertial sensors is adapted to determine the positional coordinates of the motor vehicle. Vehicle performance parameters can include, without limitation, lateral acceleration of the vehicle, longitudinal acceleration of the vehicle, wheel speed, engine revolutions per minute ("RPM"), throttle position, and steering angle. The second set of inertial sensors can include motion sensors and accelerometers, which, collectively, can be adapted to determine the heading direction (bearing) of the motor vehicle. Vehicle performance data, however, is of little use if it cannot be correlated to a precise location, which is to say, within approximately ±2-5 ft., of the motor vehicle.

Conventionally, data for determining the positional coordinates of a motor vehicle are provided by the Global Positioning System ("GPS") or an equivalent system. However, to work properly, the GPS receiver must be able to lock-on to signals from at least three of the 24 satellites, to calculate a two-dimensional position, which is to say, longitude and latitude, and, further, to track movement. If three-dimensional positioning or attitude is required, which is to say, longitude, latitude, and altitude, signals from at least four satellites must be receivable.

An average positional accuracy for GPS receivers is only about 15 meters or about 50 ft. However, that accuracy can be affected by atmospheric conditions and other factors. For example, GPS signals can be denied or jammed in some urban settings due to the size or density of nearby structures and in some rural settings due to heavy canopies and mountainous terrain. GPS signals can also be denied or jammed when the receiver is located in a dwelling, a tunnel, a canyon, a cave, and so forth. As a result, GPS-based positioning and path-mapping systems are limited in their use and their accuracy.

The development of motion sensing devices, e.g., motion sensing accelerometers, gravitational accelerometers, gyroscopes, and the like, and their integration into small, portable devices have been suggested by others, to generate input signal data. For example, U.S. Pat. No. 7,138,979 to Robin, et al. discloses methods and systems for generating input signals based on the two-dimensional orientation of the portable device. Robin discloses using cameras, gyroscopes, and/or accelerometers, to detect changes in the spatial orientation of the device and, further, to generate positional signals that are indicative of that change.

Therefore, it would be desirable to provide a terrestrial location and path-map generation system that does not rely on the acquisition of signals from a plurality of satellites, to eliminate the aforementioned use restrictions. It would further be desirable to provide a location and path-map generation system that has a degree of accuracy of approximately ±2-5 ft.

Desirable applications of the location and path-map generation system include, without limitation, the ability to monitor the route of march of small mounted or dismounted units in all terrains and environments (day or night); to identify and designate objectives for small units in all terrains and environments; to transmit or re-transmit real-time location and imagery data to lowest echelon platform users during movement; and to generate precise path-map data of unmanned systems, such as drones, missiles, unmanned vehicles, robots, and so forth.

Accurate position and path-map information would be helpful to Armed Forces and Coast Guard personnel, fire fighters, police, search and rescue teams, and emergency medical response personnel. Recreational use, e.g., in hunting, hiking, boating, sailing, parasailing, parachuting, rappelling, mountain climbing, and the like, also would benefit from accurate positional information and traversed path data.

BRIEF SUMMARY OF THE INVENTION

A device, system, and method for generating location and path-map data for displaying a location and path-map is disclosed. The device includes a first set of sensors for generating a plurality of first data signals with respect to an attitude of an object; a second set of sensors for generating a plurality of second data signals with respect to the attitude of the object; an imaging device for generating a plurality of third data signals that include a most significant feature, which is disposed in at least two images of the imaging device; and at least one processing device that is adapted to calculate a heading direction (bearing) of the device using the plurality of first data signals and the plurality of second data signals; to calculate a distance traveled along the heading direction using the plurality of third data signals; and to translate the calculated heading direction and calculated distance traveled into a leg or portion of a leg of a path-map for visual display on a two- or three-dimensional system.

BRIEF DESCRIPTION OF THE SEVERAL VIEWS OF THE DRAWING

The invention will be more fully understood with reference to the following Detailed Description of the Invention in conjunction with the Drawings of which.

DETAILED DESCRIPTION OF THE INVENTION

A location and path-map generation data acquisition and analysis device and system for providing instantaneous inertial position information and for generating traversed-path data are disclosed. The device and system are structured and arranged for use in portable devices and motor vehicles. Although the present invention will primarily describe application for use in conjunction with motor vehicles, those of ordinary skill in the art can appreciate the applicability of the invention to portable devices, especially, although not exclusively, portable wireless devices, such as mobile telephones, cellular telephones, cordless telephones, text messaging devices, pagers, talk radios, portable navigation systems, portable music players, portable video players, portable multimedia devices, personal digital assistants (PDAs), portable gaming systems, and the like.

Figure 1:
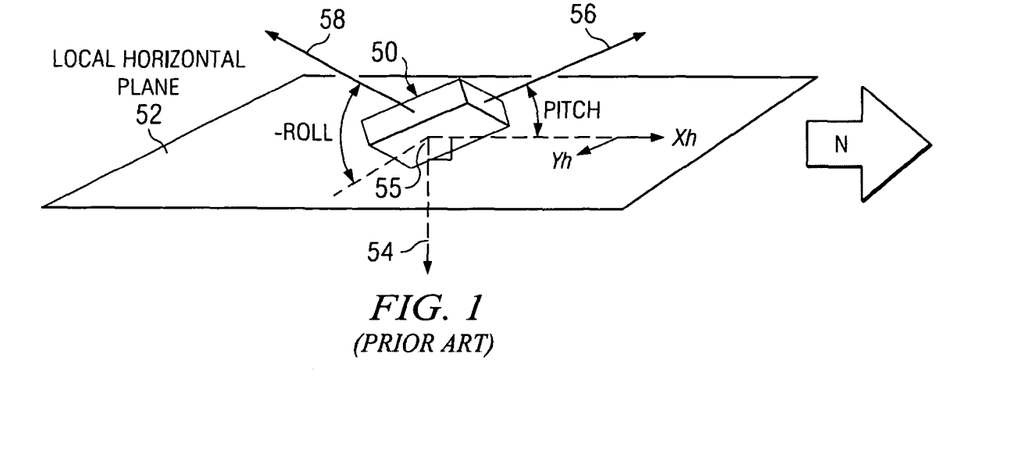
FIG. 1 shows a diagram of a tilt sensor and a reference horizontal plane.

Referring to FIG. 1, the three-dimensional attitude of any rigid object 50, such as a portable device or motor vehicle, can be described or defined by three angles: yaw (not shown), pitch, and roll, taken about a reference point 55. Each of the three angles is referenced to a local horizontal plane 52, i.e., a plane perpendicular to the Earth's gravitational vector 54. Yaw ($\alpha$) accounts for motion in the horizontal reference plane 52 and is defined as the angle in the local horizontal plane 52 measured clockwise from a true North direction, i.e., the Earth's polar axis, to the forward direction. Pitch ($\Phi$) accounts for rotation about a transverse axis and is defined as the angle between the object's longitudinal axis 56 and the local horizontal plane 52. By convention, positive pitch corresponds to a "nose up" condition and negative pitch corresponds to a "nose down" condition. Roll ($\theta$) accounts for rotation about a longitudinal axis and is defined as the rotation angle about the longitudinal axis between the local horizontal reference plane and the actual plane 58. By convention, positive roll corresponds to a "right wing down" condition and negative roll corresponds to a "left wing down" condition.

Figure 2:
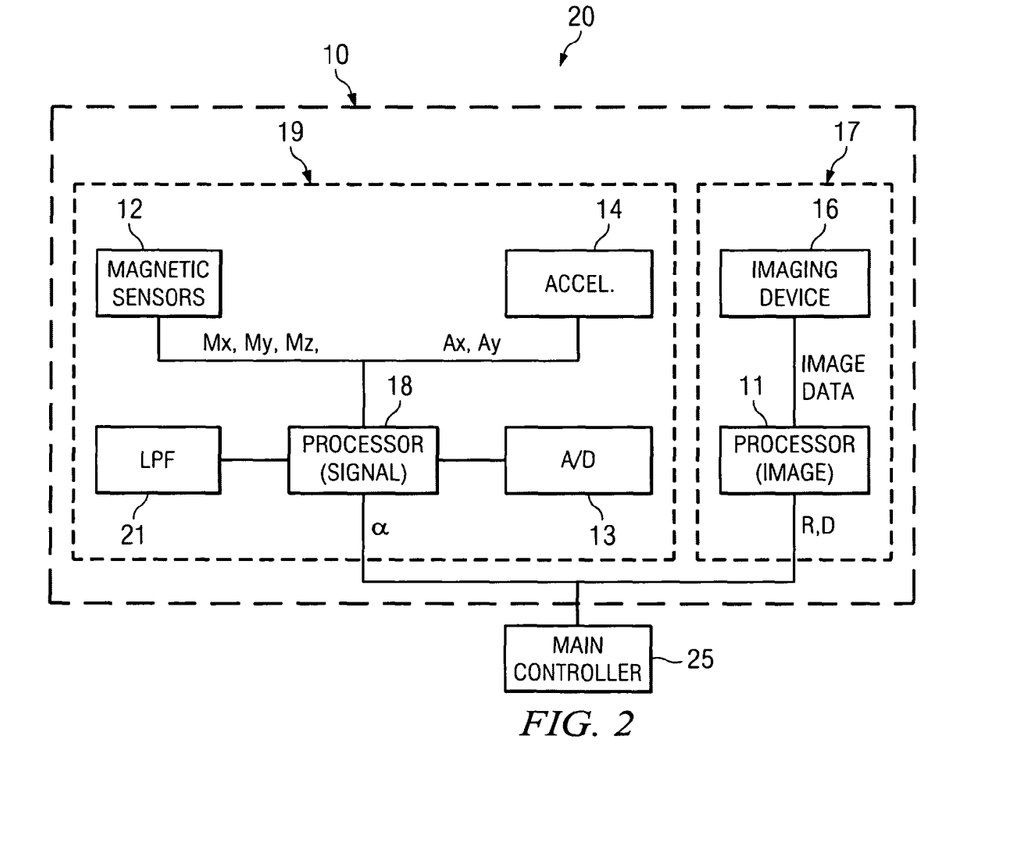
FIG. 2 shows a block diagram of a location and path-map generation device in accordance with the present invention.

The device and system include an accelerometer, a magnetic sensor, and a signal processing device, to produce a six-degree of freedom system capable of generating data signals for the calculation of a heading direction (bearing), in combination with an imaging device and an image processing device, for generating data signals for the calculation of a rate and a distance of movement. Referring to FIG. 2, the device 10 and system 20 include magnetic sensing devices or magnetic sensors 12, e.g., a magnetic compass, inertial sensors or vehicle tracking sensors 14, an imaging device 16, a signal processing device 18, and an image processing device 11. Although the signal processing portion 19 and the image processing portion 17 will be describe individually, those of ordinary skill in the art can appreciate that the processing devices 11 and 18 can be combined into a single processing device that can perform both functions.

The signal processing portion 19 is structured and arranged to generate, in pertinent part, heading direction (bearing) data. In brief, roll and pitch rotations of the object 50 can be detected using the degree of tilt of the inertial sensors 14 in the x- and y-directions and/or using the magnetic field strength about the x-, y-, and z-axes of the magnetic sensors 12. The position of the object 50 as well as its yaw, pitch, and roll angular rates can be detected using the magnetic sensors 12.

The pluralities of sensors 12 and 14 in the signal processing portion 19 are adapted to generate data signals commensurate with their acceleration-induced tilts and/or detected magnetic field strengths. The data signals are transmitted to the signal processing device 18. The signal processing device 18 processes the data signals to determine the instantaneous position, pitch, roll, and yaw of the object 50. Yaw corresponds to heading direction (bearing).

The image processing portion 17 is structured and arranged to generate image data signals for determining the distance and rate of movement of the object 50. For example, the imaging device 16 can be adapted to generate a multiplicity of images at a predetermined, fixed rate, e.g., 300,000 image frames per second, which corresponds to a temporal spacing of about 3.3 milli-seconds (msec) between successive image frames. The data signals associated with the image are transmitted to the image processing device 11. The image processing device 11 is adapted to process the image data signals to determine the distance and rate of movement or travel using demagnification techniques.

Magnetic and Inertial Sensing Devices

Motion-sensing devices or motion sensors, e.g., accelerometers, strain gauges, piezo-electric devices, piezo-resistive devices, capacitive devices, mechanical switches, gyroscopes, magnetic compasses, magnetic devices, optical devices, infrared devices, and the like, are well-known to the art as means for detecting motion in an object 50 to which they are integrated and/or fixedly attached. For full, six-degrees of freedom motion status, conventional motion sensing combines dual- or three-axis accelerometer sensing with three-axis gyroscope sensing. The accelerometers detect roll and pitch rotation as a function of the tilt of the accelerometer(s) in the x- and y-directions. Gyroscopes provide yaw, pitch, and roll angular rotation rates that are not readily obtained using the accelerometer. Hence, with conventional motion sensing, gyroscopes are necessary for six-degrees of freedom inertial sensing.

In free space, which is to say, in conditions characterized as having no gravity and no magnetic field, a two- or three-axis accelerometer and a three-axis gyroscope can be used satisfactorily, to obtain six-degrees of freedom motion information. However, due to the Earth's gravitational and magnetic fields, "free space" is not attainable terrestrially within the influence of the Earth's gravitational and magnetic fields. This is one of the reasons why conventional path-map generating systems rely on the extra-terrestrial GPS.

The device 10 includes a two-axis accelerometer 14, such as those manufactured by MEMSIC, Inc. of Andover, Mass. Although the invention will be described in connection with a two-axis accelerometer, those of ordinary skill in the art can readily adapt the teachings of the invention to other inertial sensing devices. The accelerometer 14 can be mounted on the object 50 so that each of the two sensing axes lie in a common plane, i.e., a horizontal reference plane 52, and, moreover, so that the sensing axes are orthogonal to each other. For example, the two-axis accelerometer 14 can be a monolithic structure that can be fixedly attached to a daughter printed circuit board (PCB), which, in turn, can be vertically mounted on a main PCB.

The device 10 further includes a magnetic sensor 12, such as an electronic compass or, more particularly, a strap-down electronic compass. Although the magnetic sensor 12 (electronic compass) is suitable for sensing position as well as yaw, pitch, and roll angular rates, primarily, the magnetic sensor 12 is used to detect yaw rotation using x- and y-axis sensing.

U.S. Patent Application No. 60/906,100 (Motion and Attitude Sensing for Portable Electronic Devices) assigned to Memsic, Inc. of Andover, Mass. and incorporated herein in its entirety, discloses a novel three-axis magnetic sensing device 12. The magneto-resistive sensor 12 generally includes a plurality of thin strips, e.g., four, of permalloy, e.g., NiFe magnetic material, that are configured into a Wheatstone Bridge. During operation, any changes in the applied magnetic field are accompanied by a corresponding change in the resistance of the permalloy strips. Consequently, the magnitude of the output for each sensor axis is a direct measurement of the strength of the magnetic field along the respective sensing axis.

The measured values taken by a three-axis magnetic sensor 14 are represented by parameters $M_x$, $M_y$, $M_z$, which correspond, respectively, to the magnetic field strength about the x-, y-, and z-axes. The measured values taken by a two-axis accelerometer 12 are represented by parameters $A_x$ and $A_y$, which correspond, to acceleration in the direction of the x- and y-axes.

The pitch angle ($\Phi$) of the object 50 can be calculated using the following equation:

$$\phi = \sin^{-1}(-A_x/g) \tag{1}$$

in which "g" is the acceleration of gravity of 32.2 feet per second squared (or 9.8 meters per second squared).

The roll angle ($\theta$) of the object 50 can be calculated using the following equation:

$$\theta = \sin^{-1}[A_y/(g \cdot \cos\theta)] \tag{2}$$

The yaw angle ($\alpha$), which corresponds to the heading direction (bearing) with respect to the Earth's polar axis, of the object can be calculated using the following equation:

$$\alpha = \tan^{-1}(M_{yh}/M_{xh}) \tag{3}$$

where $M_{xh} = M_x \cdot \cos\phi + M_y \cdot \sin\theta \cdot \sin\phi + M_z \cdot \cos\theta \cdot \sin\phi$
and $M_{yh} = M_y \cdot \cos\theta - M_z \cdot \sin\theta$.
in which $M_{xh}$ refers to the magnetic field strength about the x-axis in the horizontal plane 52 and $M_{yh}$ refers to the magnetic field strength about the y-axis in the horizontal plane.

Referring to FIG. 1, when the three-dimensional attitude of an object 50 is changed, that is, when the object 50 experiences rotation about one or more of the x-, y-, and z-axes, the magnetic sensor 12 generates magnetic field strength signals for each axis, $M_x$, $M_y$, $M_z$, and the inertial sensor 14 generates acceleration signals for the x- and y-axes, $A_x$ and $A_y$. These signals can be analog or digital signals.

The data signals for calculating field strength and acceleration parameters, $M_x$, $M_y$, $M_z$, $A_x$, and $A_y$, are provided to the signal processing device 18. The signal processing device 18 can be integrated into one or both of the sensors 12 and/or 14 or, alternatively, can be a separate structure within the device 10.

To improve the signal-to-noise ratio (SNR), the data signals from the inertial sensing device 14 and/or the magnetic sensing device 12 can be passed through a low-pass filter 21. Additionally or alternatively, to improve SNR, instead of using a single two-axis accelerometer 14, a pair of two-axis accelerometers 14 could be mounted vertically on the object 50 so that they are oriented in opposite directions, which is to say that one accelerometer 14 is mounted on the forward-aft axis of the object 50 and the other accelerometer 14 is mounted on the backward-aft axis of the object 50. With this arrangement, output from the pair of accelerometers would generate a signal having twice the magnitude, further diminishing the effect of noise.

If the parametric signals are analog signals, the signal processing device 18 can further include an analog to digital (A/D) converter 13. Once the signals are in digital form, they can be processed as desired using a data processing unit.

Imaging Device

An imaging device 16 and an image processing device 11 are integrated into the image processing portion 17 of the device 10 and system 20, to generate image data signals for use in calculating a distance traveled ($D_{1 \to n}$) and a rate of travel (R). The imaging device 16 is structured and arranged to generate and transmit a multiplicity of digital image signals at a predetermined, fixed speed. The image data signals should include a detectable, "most significant feature" that has at least two distinguishable dimensions, e.g., length, width, and/or height, that can be scaled. For example, the most significant feature can be a man-made structure, a utility pole, a tree, a rock outcrop, and so forth.

The imaging device 16 can be a digital camera or any similar, small, lightweight digital imaging unit that is capable of acquiring images at a predetermined rate, e.g., about 300,000 frames per second or about 0.33 msecs between images, and of instantaneously preparing a digital image data signal for transmission to the image processing device 19.

Figure 3:
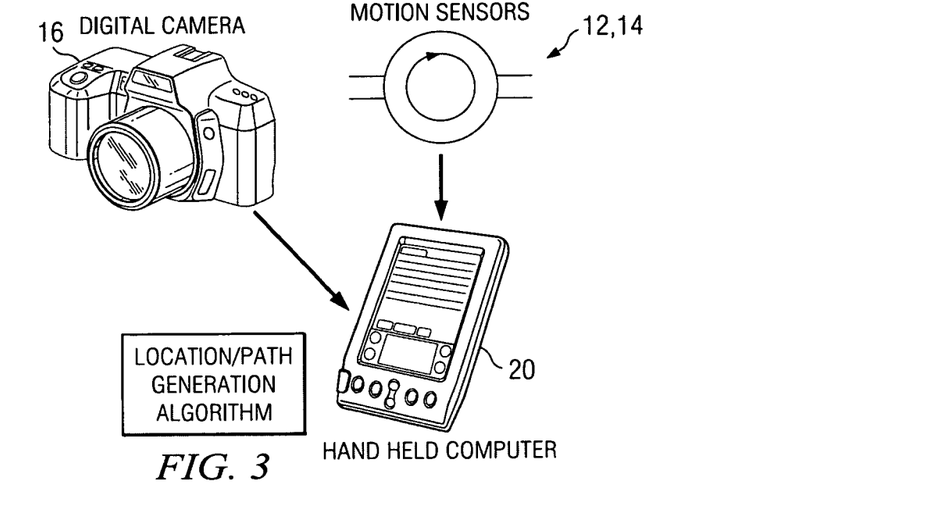
FIG. 3 shows an embodiment of a hand-held location and path-map generating device incorporating motion sensors and an imaging device in accordance with the present invention.

As shown in FIG. 3, the motion sensors 12 and 14 and the imaging device 16 can be embodied into a single system 20 that is further structured and arranged to house the signal processing device 18, the image processing device 11, and, optionally, the main controller 25.

Signal and Image Processing Devices and Main Controller

As previously mentioned, each of the signal processing device 18, the image processing device 11, and the (optional) main controller 25 can be separate devices or two or more of the devices can be integrated into a single unit. For simplicity in describing the invention, the signal processing device 18, the image processing device 11, and the main controller 25 of the illustrative system 20 are assumed to be separate devices.

Each of the signal processing device 18, the image processing device 11, and the (optional) main controller 25 can include volatile (random access memory), non-volatile memory (read-only memory), and a processor or microprocessor that is adapted to execute hardware- or software-based applications, driver programs, algorithms, and the like. The applications, driver programs, algorithms, and the like (hereinafter, collectively, "applications") can be stored in non-volatile memory and can be executed on volatile memory. Illustrative examples of such applications can include applications that process, transmit, and store analog and/or digital data signals; that calculate a distance traveled and/or heading direction (bearing) using these data signals; and/or that translate these raw or calculated data signals into a machine language or command that is capable of being executed on or by a processing device, to generate a path-map display.

More particularly, the data processing portion 19 is adapted to execute or run at least one data processing application to calculate the yaw ($\alpha$), i.e., heading direction (bearing), using equations 1 through 3 and field strength and acceleration parameteric data, respectively, from the magnetic sensors 12 and from the inertial sensors 14. The calculated yaw ($\alpha$) value(s) is/are subsequently transmitted to the image processing device 11 and/or (optionally) to a main controller 25. Alternatively, the data processing portion 19 is adapted to execute or run at least one application that merely generates data signals for transmission to the image processing device 11 and/or to the main controller 25, where yaw is calculated using equations 1 through 3 and the magnetic field strength signal data from the magnetic sensors 12 and acceleration signal data from the inertial sensors 14.

With respect to the image processing portion 17, image data signals taken by the imaging device 16 are transmitted to the image processing device 11, which is adapted to execute or run at least one application to calculate the travel rate (R) of and distance traveled ($D_{1->n}$) by the object 50 using demagnification techniques discussed in greater detail below. The image processing device 11 further transmits these calculated travel rate (R) and travel distance ($D_{1->n}$) data signals to the signal processing device 18 and/or (optionally) to the main controller 25.

At least one image processing application of the image processing portion 17 can be adapted to identify a most significant feature, e.g., a natural or artificial object, within a first image, $I_1$, that is also common to subsequent images, $I_n$, where n is a positive integer. For example, the most significant feature can be a man-made structure, a utility pole, a tree, a rock outcrop, and so forth.

Figure 4A:
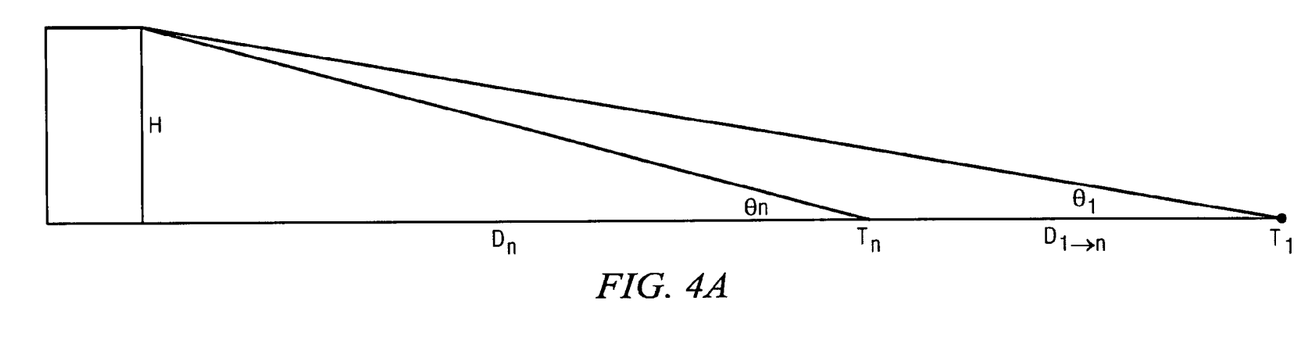
FIG. 4A shows trigonometric imaging relationships for determining the distance traveled between two points in accordance with the present invention.
Figure 4B:
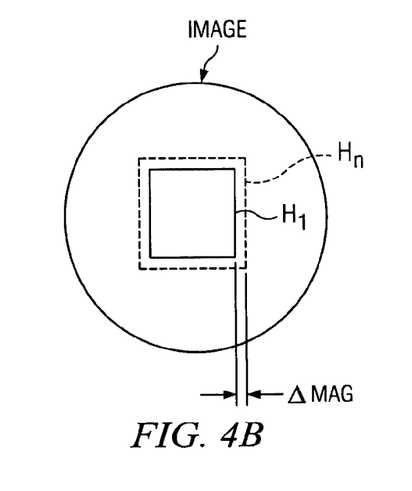
FIG. 4B shows a diagram depicting image demagnification.

The image processing portion 17 is further adapted to determine for any two images, e.g., image $I_1$ and image $I_n$, at least one dimension, i.e., length, width, and/or height, of the most significant feature that is common to both images. Referring to FIG. 4A and FIG. 4B, using the dimension(s) of the common, most significant feature measured in the two images, the image processing portion 17 is adapted to calculate a dimensionless demagnification number ($\Delta$MAG). For example, the demagnification number ($\Delta$MAG) can be obtained by using an intelligence algorithm that includes lens imaging principles and trigonometric relationships that are intuitive to those of ordinary skill in the art. Moreover, the image processing portion 17 can be adapted to modify the demagnification number ($\Delta$MAG) using historical data and through laboratory or field experimentation and calibration.

Once the image processing portion 17 has calculated the demagnification number ($\Delta$MAG), the distance $D_{1->n}$ between image $I_1$ taken at time $T_1$ and image $I_n$ taken at time $T_n$ and the rate of travel (R) can be calculated. The calculated distance traveled ($D_{1->n}$) and the rate of travel (R) can then be transmitted to the signal processing device 18 and/or (optionally) to the main controller 25. Alternatively, the image processing portion 17 is adapted to execute or run at least one application to generate data signals for transmission of the raw signal data to the signal processing device 18 and/or (optionally) to the main controller 25, where travel rate (R) and distance traveled ($D_{1->n}$) are subsequently calculated.

When data signals from the image processing portion 17 and the signal processing portion 19 are transmitted to a separate and distinct main controller 25, the main controller 25 is adapted to integrate the heading direction (bearing) data with the respective travel rate (R) and respective distance traveled ($D_{1->n}$) data. The integrated traveled distance ($D_{1->n}$) between image $I_1$ taken at time $T_1$ and image $I_n$ taken at time $T_n$ and the heading direction (bearing) data can then be converted or translated into signals for use in generating or graphically plotting and/or displaying the location and path-map of the object 50 during movement or at rest.

Method

Figure 6:
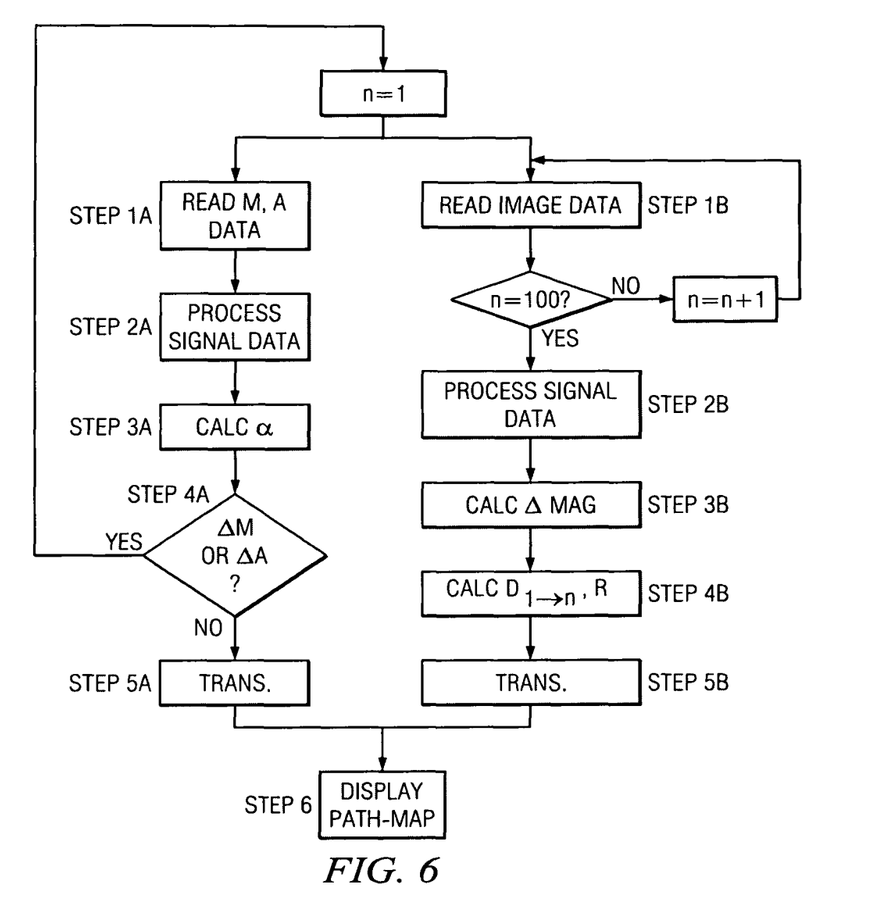
FIG. 6 shows a flow chart of a method of generating and displaying path-map data in accordance with the present invention.

Having described devices and systems for sensing and calculating heading directions (bearing) and a distance traveled and for acquiring, computing, and displaying location and path-map data, methods for calculating heading direction (bearing) and changes in heading direction (bearing); for determining a distance traveled and rate of travel while following the heading direction (bearing); and for generating input signals to an application program that is executable on a device, e.g., on a portable electronic device, that is adapted to generate and display a graphical location and path-map will now be described. A flow chart of the illustrative methods is shown in FIG. 6.

The method employs a two- or three-axis accelerometer, a three-axis magnetic field sensor, and an imaging device that are integrated into a system that is mountable on a motor vehicle or that is man transportable. The two- or three-axis accelerometer and the three-axis magnetic field sensor, e.g., an electronic compass, are adapted to generate, respectively, a first set of signals and a second set of signals (STEP 1A) while the imaging device is adapted to generate a third set of signals (STEP 1B).

The first set of signals generated by the two- or three-axis accelerometer corresponds to accelerations and/or changes in acceleration in at least the x- and y-directions, $A_x$, $A_y$, which are proportional to changes in the inertial attitude of the device. Although accelerations and/or changes in acceleration are described for the x- and y-directions, the invention works equally as well with accelerations and/or changes in acceleration in just the x-, the y-, and z-directions. The second set of signals produced by the three-axis magnetic field sensor corresponds to the magnetic field strength and/or changes in the magnetic field strengths about the x-, y-, and z-axes, $M_x$, $M_y$, $M_z$. The third set of signals produced by the imaging device corresponds to a multiplicity of real-time images that are taken at a predetermined rate, e.g., about 300,000 frames per second.

The first and second sets of generated signals are then transmitted to a signal processing device where they are processed (STEP 2A). Signal processing can include, without limitation, converting analog signals to digital signals and/or filtering the signals to reduce SNR.

Once the digital signals for the first and second set of generated signals are processed (STEP 2A), the signal processing device or, alternatively, a main controller uses the signals to calculate yaw, which is a measure of the heading direction (bearing) of the system, (STEP 3A) and/or changes thereto. When the system is rotated about one or more of its inertial axes, some or all of the accelerations and magnetic field strengths will be changed, which, in pertinent part, translates into changes in yaw.

After one or more of STEPS 1A to 3A, changes in successive first and second sets of signals data ($\Delta$M and/or $\Delta$A) can be determined (STEP 4A) to ascertain whether or not the changes are appreciable enough, which is to say that the changes would sufficiently change the yaw calculation to connote a change in heading direction (bearing) rather than a mere wandering. This step (STEP 4A) will operate, inter alia, to minimize the number of first and second sets of signals transmitted, the amount of filtering performed on the transmitted data, and the number of calculation performed.

The calculated yaw is then translated into input signals (STEP 5A) that are compatible with an application program that is being executed on or that is executable by the system or, alternatively, by a local or remote processing device in communication with the system. These translated signals can be used by one or more of the signal processing device, the image processing device, and a main controller, where the yaw ($\alpha$) angle and distance traveled ($D_{1->n}$) are merged at time $T_n$, to provide a leg or some portion of a leg of a path-map. More specifically, the calculated yaw ($\alpha$) is translated into machine language input signals (STEP 5A) to change an operation on the application program.

While STEPS 1A to 5A are being continuously performed, simultaneously or substantially simultaneously therewith, the third set of signals, e.g., digital image signals, are being generated by an imaging device (STEP 1B). To reduce the amount of image data being transmitted, filtered, and used to calculate the demagnification number (ΔMAG), rate of travel (R), and distance traveled ($D_{1\to n}$), the device and system can be adapted to transmit, filter, and or make calculations using a sampling period of n, where n is a positive integer (e.g., 100, 1000, and so forth) representative of the number of frames between sampling images.

For illustrative purposes only, n in FIG. 6 is shown equal to 100 so that after the sampling clock is set (or re-set) to n=1, image signal data corresponding to the third set of signals will not be transmitted, filtered and/or used in calculating the demagnification number (ΔMAG), etc. until the next one-hundredth image. FIG. 6 further shows that the sampling clock can be set (or re-set) upon the occurrence of an appreciable change in the heading direction (bearing) as evidenced by appreciable changes in the magnetic field strength (ΔM) and/or acceleration (ΔA). Thus, the sampling clock is set or re-set artificially or upon the occurrence of certain events.

The image signal data are then transmitted to an image processing device where the signal data can be processed (STEP 2B). Image processing of the digital image data signals can include, without limitation, filtering the signals to reduce SNR, gray-shading, and the like.

Once the image signal data for the third set of generated signals are processed (STEP 2B), the image processing device or, alternatively, a main controller that is coupled to the image processing device, first identifies in successive images a most significant feature common to each of the image signals. For example, the most significant feature in the image can be a natural object, e.g., a structure or utility pole, or an artificial structure, e.g., a rock outcrop or a tree. Having identified a most significant feature common to successive images, the image processing device uses at least one of the dimensions of the most significant object and the elapsed time between sample times to calculate a demagnification number (ΔMAG) (STEP 3B). The demagnification number (ΔMAG) is a dimensionless value that results as the imaging device is moved closer to the most significant feature. Subsequently, the image processing device uses the demagnification number (ΔMAG) to back-calculate the distance traveled ($D_{1\to n}$) between sample time $T_1$ and sample time $T_n$, and the rate of travel (R) (STEP 4B).

Figure 5:
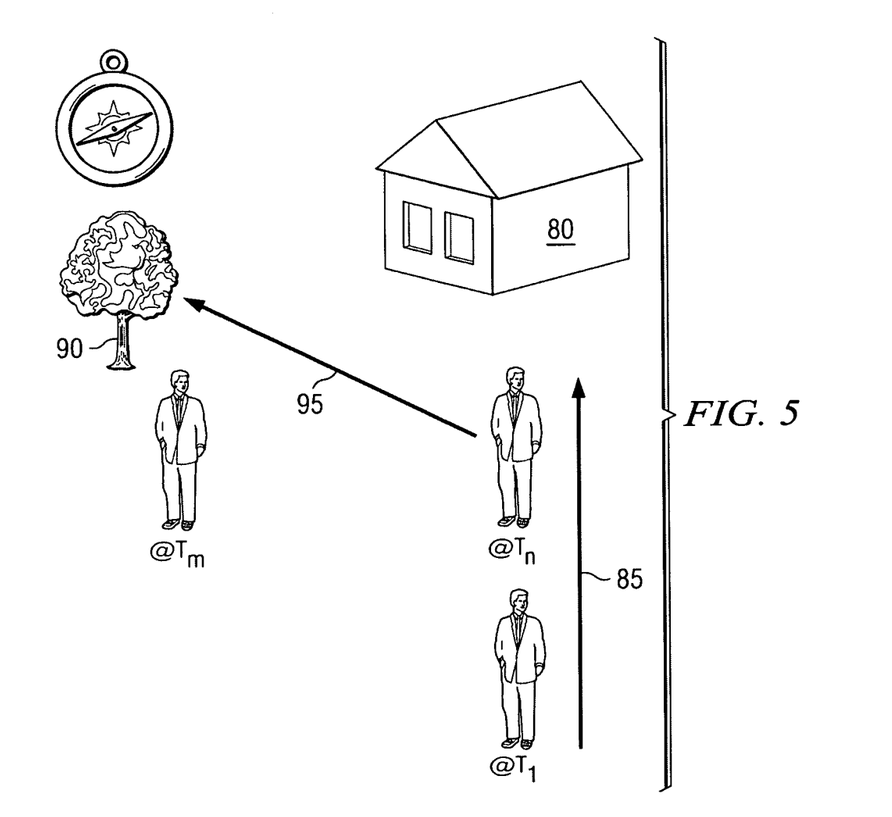
FIG. 5 shows a diagram for generating data for calculating a distance traveled and for generating a path-map in accordance with the present invention.

Demagnification is shown conceptually and illustratively in FIG. 4B and FIG. 5. The diagram shown in FIG. 5 shows the system being transported manually. At sample time $T_1$, which corresponds to the first time interval of a new clock, the imaging device records a first image $H_1$ that can be correlated to a first heading direction (bearing) 85. As long as and while the system travels in the first heading direction (bearing) 85 and/or within a few degrees of the first heading direction (bearing), e.g., ±5 degrees, the image processing device or main controller is adapted to identify the man-made structure 80 as the most significant feature. At sample time $T_1$, the man-made structure 80 will produce a first image $H_1$.

As the imaging device and system are moved closer to the man-made structure 80, at time $T_n$, at least one of the dimensions of the respective image $H_n$ will increase with respect to the first image $H_1$. The change(s) in dimension(s) between the two images $H_1$ and $H_n$ can be scaled or otherwise measured. This increase in dimension corresponds to demagnification (ΔMAG), which in FIG. 4B is shown graphically as a change in both length and height.

As previously mentioned, when the device or systems heading direction (bearing) changes sufficiently from the first heading direction (bearing) 85, the change in the calculated yaw and/or the appreciable changes in the magnetic field strength and/or acceleration can automatically set or re-set the sample clock to n=1. With each new sample clock, the image processing device or, alternatively, a main controller, will continue to identify a most significant feature that is common to successive images, such as a tree 90. The image processing device or main controller again uses temporally-spaced image data signals to calculate the demagnification number (ΔMAG) of the most significant feature in the image (STEP 3B). The image processing device uses the demagnification number (ΔMAG) further to calculate the distance traveled ($D_{n\to m}$) between sample time $T_n$ and sample time $T_m$, where m is a positive integer (STEP 4B).

The calculated distance traveled ($D_{1\to n}$ or $D_{n\to m}$) and rate of travel (R) are then translated into input signals (STEP 5B) that are compatible with the location and path-map generating application program that is being executed on or that is executable by the system and/or, alternatively, by a local or remote device in communication with the system (STEP 5B). In particular, in conjunction with a location and path-map generating application, the distance traveled between sample times ($D_{1\to n}$) and the rate of travel (R) are translated into input signals and these input signals are matched to the appropriate heading direction (bearing) signals. Consequently, the application program will display the associated heading direction (bearing) and distance traveled in an appropriate graphical manner (STEP 6) that can be shown by each leg of movement, cumulatively, and so forth. When changes in heading direction (bearing) and distances traveled along that heading direction (bearing) are translated and input into the application program, a two- or three-dimensional display image is adjusted proportional to the input signals.

Application of the present invention, however, is not limited to portable devices. Indeed, the present invention is applicable to any electronic device, whether portable or not, having a human-machine, i.e., user, interface.

Although the invention has been described in connection with a motor vehicle or manual transportation, the invention is not to be construed as being limited thereto. For example, the "vehicle" could be a sea- or ocean-going vessel, an aircraft, a spacecraft, a rocket, a missile, a satellite, a digital camera, and the like. Those of ordinary skill in the art will appreciate that variations to and modification of the above-described device, system, and method. Accordingly, the invention should not be viewed as limited except as by the scope and spirit of the appended Claims.

What is claimed is:

1. A device for generating location and path-map data for displaying a location and path-map of an object in motion, the device comprising:
    a first set of magnetic sensors for generating a plurality of first data signals with respect to an attitude of the object;
    a first set of inertial sensors for generating a plurality of second data signals with respect to the attitude of the object;
    an imaging device for generating a plurality of temporally-spaced images; and
    at least one processing device that is adapted to:
        calculate a first heading direction (bearing) of a first path along which the object is traveling using the plurality of first data signals and the plurality of second data signals;
        while the object is still in motion along the first heading direction, identify a first image taken at a first location on the first path and a temporally subsequent second image taken at a second location on the first path;
        identify a most significant feature in the first image in common with the temporally subsequent second image;

calculate a demagnification number using a relationship between at least one dimension of the most significant feature in the first image and the at least one dimension of said most significant feature in the second image;

calculate a distance traveled by the object along the first path in the first heading direction using the calculated demagnification number; and translate the calculated heading direction and calculated distance traveled into a leg or portion of a leg of a path-map for visual display on a two- or three-dimensional system.

2. The device as recited in claim 1, wherein the first set of magnetic sensors includes a set of magnetic sensors that are structured and arranged to generate the plurality of first data signals corresponding to magnetic field strength about three orthogonal axes.

3. The device as recited in claim 1, wherein the first set of inertial sensors includes a set of inertial sensors that are structured and arranged to generate the plurality of second data signals corresponding to accelerations along two or three orthogonal axes.

4. The device as recited in claim 1, wherein the imaging device is structured and arranged to generate the plurality of images at a predetermined, fixed frequency.

5. The device as recited in claim 1, wherein the at least one processing device includes:
a signal processing device that is electrically coupled to the first set of magnetic sensors and the first set of inertial sensors; and
an image processing device that is electrically coupled to the imaging device and to the signal processing device.

6. The device as recited in claim 5, wherein the at least one processing device further includes a main controller that is electrically coupled to each of the signal processing device and the image processing device.

7. The device as recited in claim 1, wherein the first set of magnetic sensors includes a three-axis electronic compass.

8. The device as recited in claim 1, wherein the first set of inertial sensors includes a two- or three-axis accelerometer.

9. The device as recited in claim 1, wherein the at least one processing device calculates heading direction ($\alpha$) using the equation:

$$\alpha = \tan^{-1}(M_{yh} / M_{xh})$$

where $M_{xh} = M_x \cdot \cos\phi + M_y \cdot \sin\theta \cdot \sin\phi + M_z \cdot \cos\theta \cdot \sin\phi$
and $M_{yh} = M_y \cdot \cos\theta - M_z \cdot \sin\theta$,
in which $M_{xh}$ refers to the magnetic field strength about the x-axis in a horizontal plane; $M_{yh}$ refers to the magnetic field strength about the y-axis in the horizontal plane; $\theta$ (theta) is the roll of the object and $\phi$ (phi) is the pitch of the object.

10. The device as recited in claim 1, wherein the at least one processing device translates the calculated heading direction and the calculated distance traveled into a leg vector or portion of a leg vector.

11. A method of providing data for generating and displaying a location or path-map on a device or system while an object is in motion, the method comprising:
generating a plurality of first data signals with respect to an attitude of the object;
generating a plurality of second data signals with respect to the attitude of the object;
generating a plurality of temporally-spaced images using an imaging device;
calculating a first heading direction (bearing) of a first path along which the object is traveling using the plurality of first data signals and the plurality of second data signals;
while the object is still in motion along the first heading direction, identifying a first image taken by the imaging device at a first location on the first path and a temporally subsequent second image taken by the imaging device at a second location on the first path;
identifying a most significant feature in the first image in common with the temporally subsequent second image;
calculating a demagnification number using a relationship between at least one dimension of the most significant feature in the first image and the at least one dimension of said most significant feature in the second image;
calculating a distance traveled by the object along the first path in the first heading direction using the calculated demagnification number; and
translating the calculated heading direction and calculated distance traveled into a leg or portion of a leg of a path-map for visual display on the device or system.

12. The method as recited in claim 11, wherein generating the first data signals includes generating data signals corresponding to magnetic field strength about three orthogonal axes using magnetic sensors.

13. The method as recited in claim 11, wherein generating the second data signals includes generating data signals corresponding to accelerations along two or three orthogonal axes using inertial sensors.

14. The method as recited in claim 11, wherein generating the images occurs at a predetermined, fixed frequency.

15. The method as recited in claim 11, wherein heading direction (a) is calculated using the equation:

$$\alpha = \tan^{-1}(M_{yh} / M_{xh})$$

where $M_{xh} = M_x \cdot \cos\phi + M_y \cdot \sin\theta \cdot \sin\phi + M_z \cdot \cos\theta \cdot \sin\phi$
and $M_{yh} = M_y \cdot \cos\theta - M_z \cdot \sin\theta$,
in which $M_{xh}$ refers to the magnetic field strength about the x-axis in a horizontal plane; $M_{yh}$ refers to the magnetic field strength about the y-axis in the horizontal plane; $\theta$ (theta) is the roll of the object and $\phi$ (phi) is the pitch of the object.

16. The method as recited in claim 11, further comprising:
determining when an appreciable change in at least one of heading direction (bearing), magnetic field strength, and acceleration occurs; and
upon determination of the appreciable change:
identifying a second most significant feature common to a third image and a temporally successive fourth image; and
calculating a second demagnification number using a relationship between at least one dimension of the second most significant feature in the third image and the at least one dimension of the second most significant feature in the fourth image.

17. A system for displaying location and path-map data of an object in motion, the system comprising:
a first set of magnetic sensors for generating a plurality of first data signals with respect to an attitude of the object;
a first set of inertial sensors for generating a plurality of second data signals with respect to the attitude of the object;
an imaging device for generating a plurality of temporally-spaced images;
a first processing device that is adapted to calculate a first heading direction (bearing) of a first path along which the object is traveling using the plurality of first data signals and the plurality of second data signals;

a second processing device that is adapted to:
  while the object is still in motion along the first heading direction, identify a first image taken at a first location on the first path and a temporally subsequent second image taken at a second location on the first path;
  identify a most significant feature in the first image in common with the temporally subsequent second image;
  calculate a demagnification number using a relationship between at least one dimension of the most significant feature in the first image and the at least one dimension of said most significant feature in the second image; and
  calculate a distance traveled by the object along the first path in the first heading direction using the calculated demagnification number;
a third processing device that is adapted to translate the calculated heading direction and the calculated distance traveled into a leg or portion of a leg of a path-map; and
a two- or three-dimensional display screen for displaying the leg or leg portion.

* * * * *